US 8,254,278 B2

(12) United States Patent
Sterman et al.

(10) Patent No.: US 8,254,278 B2
(45) Date of Patent: Aug. 28, 2012

(54) EFFICIENT ADDRESS CACHING FOR PACKET TELEPHONY SERVICES

(75) Inventors: Baruch Sterman, Efrat (IL); David Schwartz, Ginor Shomron (IL); Eli Katz, London (GB)

(73) Assignee: Xconnect Global Networks Ltd (GB)

( * ) Notice: Subject to any disclaimer, the term of this patent is extended or adjusted under 35 U.S.C. 154(b) by 353 days.

(21) Appl. No.: 11/915,231

(22) PCT Filed: May 23, 2006

(86) PCT No.: PCT/IL2006/000608
§ 371 (c)(1),
(2), (4) Date: Feb. 27, 2008

(87) PCT Pub. No.: WO2006/126196
PCT Pub. Date: Nov. 30, 2006

(65) Prior Publication Data
US 2008/0198997 A1    Aug. 21, 2008

Related U.S. Application Data

(60) Provisional application No. 60/684,154, filed on May 23, 2005.

(51) Int. Cl.
*H04J 1/16* (2006.01)
(52) U.S. Cl. ............ 370/252; 370/395.2; 370/401
(58) Field of Classification Search .......... None
See application file for complete search history.

(56) References Cited

U.S. PATENT DOCUMENTS

| 5,227,778 A | * | 7/1993 | Vacon et al. | 340/825.52 |
| 7,239,629 B1 | * | 7/2007 | Olshansky et al. | 370/353 |
| 2003/0039241 A1 | * | 2/2003 | Park et al. | 370/352 |
| 2004/0042605 A1 | * | 3/2004 | Evslin | 379/220.01 |
| 2004/0042606 A1 | * | 3/2004 | Zino et al. | 379/220.01 |
| 2004/0057419 A1 | * | 3/2004 | Stanford | 370/352 |
| 2005/0025294 A1 | * | 2/2005 | Matsuhashi et al. | 379/88.17 |

FOREIGN PATENT DOCUMENTS
WO     2004036888     4/2004

OTHER PUBLICATIONS
European Search Report EP 06 72 8371; Dated Apr. 14, 2009.

* cited by examiner

*Primary Examiner* — Gregory Sefcheck
*Assistant Examiner* — Daniel Mitchell
(74) *Attorney, Agent, or Firm* — Cantor Colburn LLP (57) ABSTRACT

A method for telephony includes receiving at a facility of a telephone service provider a first subscriber request to place a first call to a specified telephone number. A provider request is sent to a remote server (26), which maintains a database (28) of records associating telephone numbers with respective packet network addresses, for a record (72) indicating a packet network address to which calls to the specified telephone number should be placed. Upon receiving the record from the remote server, the record is stored in a local cache (42) at the facility of the telephone service provider. After storing the record, upon receiving at the facility of the telephone service provider a second subscriber request to place a second call to the specified telephone number, the record is read from the local cache and is used in placing the second call to the packet network address.

47 Claims, 3 Drawing Sheets

| NUMBER | DEST | UPDATE TTL | PERSISTENCE TTL |
|---|---|---|---|
| 12127721212 | ITSP13 | 5/7/2006 | 5/28/2006 |
| 12127721218 | PSTN | 5/5/2006 | 5/10/2006 |
| 12135551234 | CENTRAL | 5/4/2006 | 5/20/2006 |
| ⋮ | ⋮ | ⋮ | ⋮ |

FIG. 4

EFFICIENT ADDRESS CACHING FOR PACKET TELEPHONY SERVICES

CROSS-REFERENCE TO RELATED APPLICATION

This application claims the benefit of International Patent Application No. PCT/IL2006/000608 filed on May 23, 2005 designating the United States of America, which claims the benefit of and priority to U.S. Provisional Patent Application 60/684,154, filed May 23, 2005, which is incorporated herein by reference.

FIELD OF THE INVENTION

The present invention relates generally to packet telephony, and specifically to methods and systems for storing and accessing subscriber addresses for packet telephony services.

BACKGROUND OF THE INVENTION

Internet telephony service providers (ITSPs) offer their subscribers Voice over Internet Protocol (VoIP) service with the "look and feel" of plain old telephone service (POTS). ITSPs provision their subscribers with Direct Inward Dial (DID) numbers in the standard format of conventional telephone numbers, as mandated by Recommendation E.164 of the International Telecommunications Union (ITU-T). ITSPs deploy gateways to interface between their IP networks and the public switched telephone network (PSTN), so as to enable direct dialing between PSTN users and their subscribers' IP phones.

Typically, when a subscriber of a given ITSP places an outgoing call to a destination telephone number that is known to correspond to an IP address (such as a DID belonging to the same ITSP), the ITSP routes the call to the destination over the IP network. When the destination telephone number is not recognized, however, the ITSP cannot generally determine whether the number indicates an IP phone or PSTN phone. Therefore, the ITSP must generally route the call through a gateway to the PSTN. If the destination number is a DID assigned by another ITSP, the call is then routed over the PSTN to the gateway of the destination ITSP.

The ENUM standard has been developed to provide standardized mapping between E.164 telephone numbers and Internet uniform resource identifiers (URIs) using the well-known Domain Name System (DNS). ENUM is defined by Faltstrum in Request for Comments (RFC) 2916 of the Internet Engineering Task Force (IETF), entitled "E.164 Number and DNS" (2000). Using ENUM, international telephone numbers are stored in the centralized DNS database in the e164.arpa domain and may be accessed using standard queries and other protocol features of DNS. DNS is described in detail by Mockapetris in IETF RFC 1034, entitled "Domain Names—Concepts and Facilities" (1987), and in IETF RFC 1035, entitled "Domain Names—Implementation and Specification" (1987). The above RFC documents are available at www.ietf.org and are incorporated herein by reference.

SUMMARY OF THE INVENTION

In embodiments of the present invention, a central database holds records associating telephone numbers with corresponding Internet addresses, such as URIs or IP addresses. Typically, the database holds information regarding DIDs assigned by multiple different ITSPs and enterprises. In an exemplary embodiment, as described in detail hereinbelow, the records are maintained in ENUM format and are accessed using DNS. Alternatively, other formats, protocols, standards may be used to store and transfer the database records. When an ITSP subscriber places a call to an unknown destination number, the ITSP may consult the central database in order to determine whether the destination number is assigned to an IP phone and, if so, to receive a packet network address to which the call should be routed. When the destination number does not appear in the database, the ITSP routes the call to the PSTN.

In general, the size of the central database and the continual updates that occur make it impractical for each ITSP to hold a complete copy of the database. Furthermore, because of competition for subscribers, ITSPs may not be willing to have the centralized database release their subscriber records to non-trusted parties. On the other hand, if ITSPs must query the central database and then wait for a response before every call they place outside their own subscriber base, subscribers may incur long delays before their calls are completed.

In order to mitigate these problems, in some embodiments of the present invention, an ITSP maintains a local cache, in which it stores records received from the central database. The first time a subscriber places a call to a given telephone number, the ITSP queries the central database, and then stores a record in its local cache based on the response that it receives. Typically, if the telephone number was found in the central database, the record in the local cache indicates the packet network address (such as a URI or IP address) to which calls to that number should be routed. If the central database returns a negative response, indicating that the telephone number was not found, the local cache stores a record indicating that calls to that number should be routed to the PSTN. In either case, when subsequent calls are placed to the same telephone number, the ITSP will discover the appropriate routing information—packet network or PSTN—in the cache and will not have to consult the central database again. Since subscribers place the large majority of their calls (typically about 80%) to numbers that they have already called in the past, the ITSP will have a high rate of cache hits, without requiring enormous amounts of memory to hold the cache records.

Further enhancements to the efficiency and security of access to the records in the central database are described hereinbelow.

There is therefore provided, in accordance with an embodiment of the present invention, a method for telephony, including:

receiving at a facility of a telephone service provider a first subscriber request to place a first call to a specified telephone number;

responsively to the first subscriber request, sending a provider request to a remote server, which maintains a database of records associating telephone numbers with respective packet network addresses, for a record indicating a packet network address to which calls to the specified telephone number should be placed;

upon receiving the record from the remote server, storing the record in a local cache at the facility of the telephone service provider;

after storing the record, receiving at the facility of the telephone service provider a second subscriber request to place a second call to the specified telephone number; and responsively to the second subscriber request, reading the record from the local cache and responsively to the record, placing the second call to the packet network address.

Typically, the second call is placed without sending a further provider request to the remote server.

The provider request may be a first provider request for a first record with respect to a first telephone number, and the method may include receiving at the facility of the telephone service provider a third subscriber request to place a third call to a second telephone number, responsively to the third subscriber request, sending a second provider request to the remote server with respect to the second telephone number, and upon receiving a reply from the remote server indicating that the second record was not found in the database, placing the third call via a public switched telephone network (PSTN), and storing a second record in the local cache indicating that further calls to the second telephone number are to be placed via the PSTN.

In some embodiments, the method includes selecting a group of the telephone numbers in the database that share a common characteristic, and downloading to the local cache from the remote server all of the records with respect the telephone numbers in the group. In one embodiment, selecting the group includes making a count of the records that have been stored in the local cache responsively to subscriber requests to place calls to the telephone numbers that share the common characteristic, and downloading all of the records with respect the telephone numbers in the group if the count is equal at least to a predetermined threshold. Alternatively or additionally the common characteristic may include at least one of a country code and an area code.

In some embodiments, storing the record includes setting an update time in the record, and upon expiration of the update time, automatically sending a further provider request to the remote server in order to update the record, independently of receiving subscriber requests to call the specified telephone number. In one embodiment, storing the record further includes setting a persistence time in the record, and automatically purging the record if no further subscriber request to call the specified telephone is placed before expiration of the persistence time.

Typically, sending the provider request and receiving the record include communicating with the remote server in accordance with a first protocol, while reading the record may include delivering the record from the local cache to the telephone service provider in accordance with a second protocol, different from the first protocol.

In a disclosed embodiment, the record is received over a public network from the remote server in an encrypted format, and the method includes decrypting the record at the facility of the telephone service provider. The record that is stored in the local cache may also be encrypted. Additionally or alternatively, reading the record from the local cache may include providing the network address subject to a data access restriction.

Typically, the telephone service provider that receives the first subscriber request is a first telephone service provider, while the specified telephone number is assigned to a subscriber of a second telephone service provider, and the packet network address indicated by the record may belong to an intermediary server, which is configured to connect the first and second calls to the specified telephone number without enabling the first telephone service provider to determine that the calls have been placed via the second telephone service provider.

Additionally or alternatively, the packet network address belonging to the intermediary server is a first packet network address, and the method includes associating access permissions with the records at the remote server, so that responsively to the permissions associated with the record with respect to the specified telephone number, the remote server furnishes to a third telephone service provider a second packet network address belonging to the second telephone service provider for use in placing a third call to the specified telephone number, while furnishing only the first packet network address to the first telephone service provider.

In a disclosed embodiment, sending the provider request includes sending a Domain Name System (DNS) request to the remote server, and placing the first and second calls includes placing Voice over Internet Protocol (VoIP) calls.

In one embodiment, sending the provider request includes sending a first provider request with respect to the specified telephone number to a first remote server, receiving a reply from the first remote server indicating that the record was not found in the database, sending a second provider request with respect to the specified telephone number to a second remote server, and upon receiving the record from the second remote server, storing the record in the local cache.

In a disclosed embodiment, storing the record includes storing the record at a node of a tree structure in the local cache, wherein the node is selected responsively to the specified telephone number, and wherein reading the record includes searching the tree.

There is also provided, in accordance with an embodiment of the present invention, telephony apparatus for deployment at a facility of a telephone service provider, the apparatus including:

a cache, which is arranged to store, at the facility of the telephone service provider, records associating telephone numbers with respective packet network addresses; and a local server, which is configured to receive first and second subscriber requests directed to the telephone service provider to place successive first and second calls, respectively to a specified telephone number, wherein the cache is operative, responsively to the first subscriber request, to send a provider request to a remote server, which maintains a database of the records associating the telephone numbers with the respective packet network addresses, for a record indicating a packet network address to which calls to the specified telephone number should be placed, and upon receiving the record from the remote server, to store the record, and wherein the cache is further operative, responsively to receiving the second subscriber request and to the record stored by the cache, to cause the local server to place the second call to the packet network address.

There is additionally provided, in accordance with an embodiment of the present invention, a system for telephony, including:

a remote server, which is arranged to maintain a database of records associating telephone numbers with respective packet network addresses; and a local server for deployment at a facility of a telephone service provider, in communication with the remote server via a public network, the local server including a local cache, wherein the local server is arranged, in response to a first subscriber request to place a first call to a specified telephone number, to send a provider request to the remote server, for a record indicating a packet network address to which calls to the specified telephone number should be placed, and upon receiving the record from the remote server, to store the record in the local cache at the facility of the telephone service provider, and wherein the local server is arranged, in response to receiving a second subscriber request to place a second call to the specified telephone number after storing the record, to read the record from the local cache and responsively to the record, to place the second call to the packet network address.

In a disclosed embodiment, the remote server is arranged to receive a selection of a group of the telephone numbers in the database that share a common characteristic, and to download to the local server all of the records with respect the telephone numbers in the group. At least one of the remote server and the local server may be arranged to select the group of the telephone numbers responsively to a count of subscriber requests to place calls to the telephone numbers that share the common characteristic.

The present invention will be more fully understood from the following detailed description of the embodiments thereof, taken together with the drawings in which:

DETAILED DESCRIPTION OF EMBODIMENTS

System Overview

Figure 1:
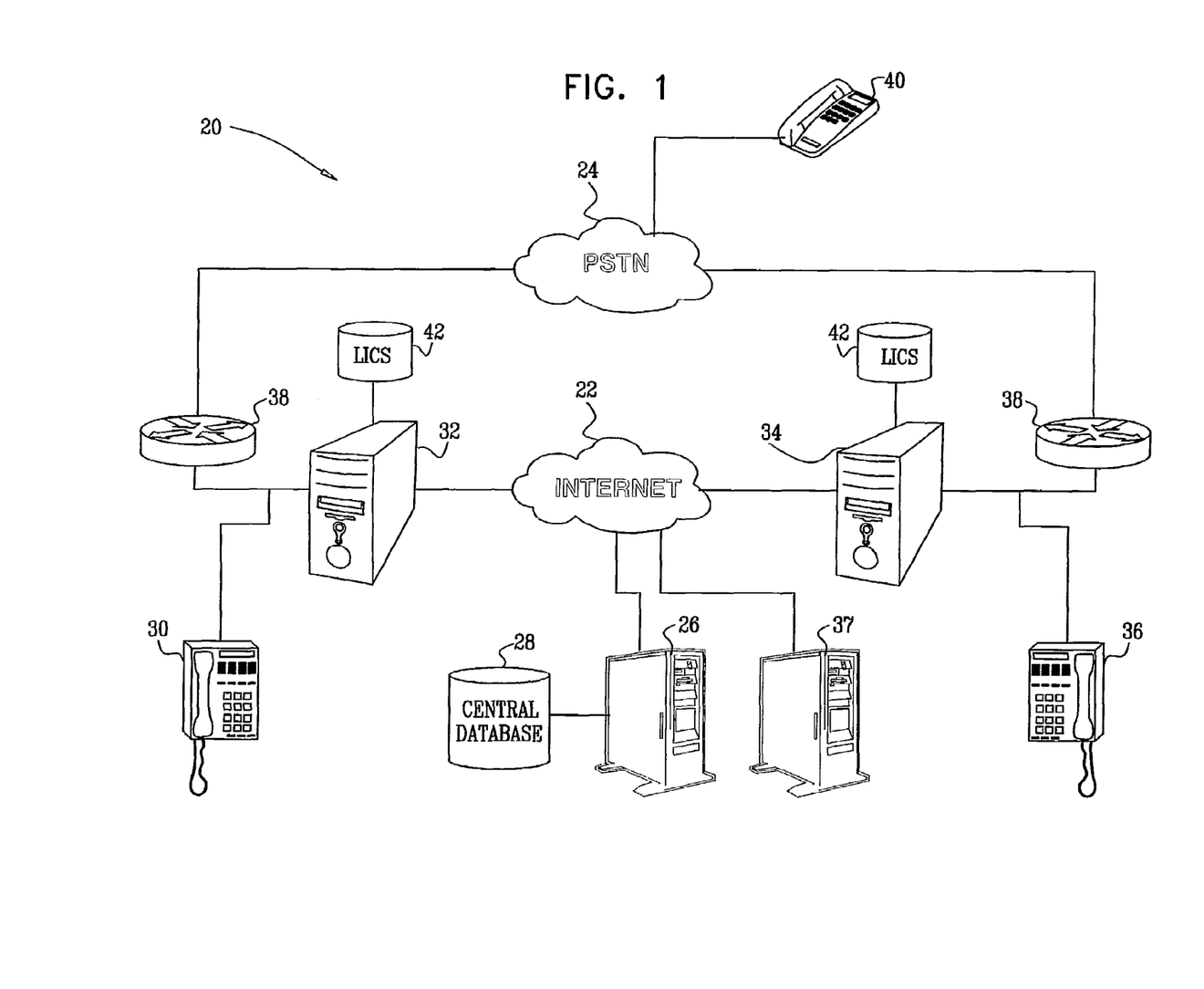
FIG. 1 is a block diagram that schematically illustrates a system for Internet-based telephony, in accordance with an embodiment of the present invention.

FIG. 1 is a block diagram that schematically illustrates a system 20 for Internet-based telephony, in accordance with an embodiment of the present invention. The system permits Internet telephony users to place calls over either a packet network 22, such as the public Internet, or a PSTN 24, depending on the destination telephone number of each call. This inter-network functionality is supported by a central database 28 containing records indicating the correspondence between E.164 telephone numbers and packet network addresses, in the form of URIs that can be placed directly into a SIP message for routing. The central database is accessible via a central server 26, which is typically maintained by a trusted central authority. In the description that follows, for the sake of simplicity, it will be assumed that database 28 stores records in ENUM format and may be accessed over network 22 using DNS protocols. Alternatively, other data formats and protocols may be used.

In the scenario shown in FIG. 1, an IP telephony subscriber places a call using an IP phone 30 to a certain destination telephone number. IP phone 30 accordingly sends a Session Initiation Protocol (SIP) INVITE message to the subscriber's ITSP 32 asking to establish the call to the destination number. ITSP 32 queries a local intelligent caching server (LICS) 42 (typically using either ENUM or SIP, for example) for the destination URI. Assuming ITSP 32 has not placed a call to this destination number in the past, the LICS queries database 28 via server 26. Server 26 responds to the LICS by indicating, for example, that the destination number belongs to a subscriber that is served by a certain SIP proxy operated by a destination ITSP 34. The LICS returns this response to ITSP 32, which then sends a SIP INVITE message to ITSP 34, which locates the subscriber to whom the destination number is assigned—in this case on an IP phone 36—and sends a SIP INVITE message to the IP address of phone 36. ITSPs 32 and 34 thus connect IP phones 30 and 36 to communicate via packet network 22.

The protocols of DNS and ENUM, as are known in the art, permit ITSP 32 to access (either directly or via the LICS) the records in database 28 freely and thus to determine that ITSP 34 serves the destination telephone number in question. This sort of free access may be problematic in the Internet telephony business environment, since it may enable ITSP 32 to identify and attempt to woo away the subscribers of ITSP 34. Therefore, in some embodiments of the present invention, described hereinbelow in greater detail, server 26 informs ITSP 32 (either directly or via the LICS) that ITSP 34 is the proxy for phone 36 only if ITSP 34 has given permission to release this information to ITSP 32. Otherwise, server 26 responds to the query by ITSP 32 by indicating that the call to the destination number should be routed to an anonymizing intermediate server 37, which may be operated by or affiliated with the central authority. Server 37 then routes the call to ITSP 34 without revealing the actual call destination to ITSP 32.

Alternatively, in some cases, the destination telephone number indicated in the query by ITSP 32 may not be listed in database 28. There will be no listing, for example, when the destination number belongs to a PSTN phone 40 or when the destination number belongs to an ITSP or enterprise that has not released its records to central database 28. In this case, server 26 will return a negative response, indicating that the number in question was not found in the central database. (Server 26 may also return a negative response when ITSP 32 is not authorized to access records belonging to ITSP 34.) As a result of the negative response, ITSP 32 will route the call to a VoIP gateway 38, which will then place the call to the destination number via PSTN 24.

The query and response-handling functions of ITSP 32 may be performed by LICS 42. The LICS maintains a cache containing records of correspondence between destination telephone numbers and packet network addresses (typically in the form of URIs). For some destination telephone numbers, the cache contains negative records, reflecting negative responses from server 26, which indicate that calls to these numbers are to be placed via the PSTN. Upon receiving a call request from a subscriber, ITSP 32 typically consults LICS 42 before taking further action. In most cases, the LICS will return call routing instructions from the cache without the necessity of querying central database 28.

Figure 2:
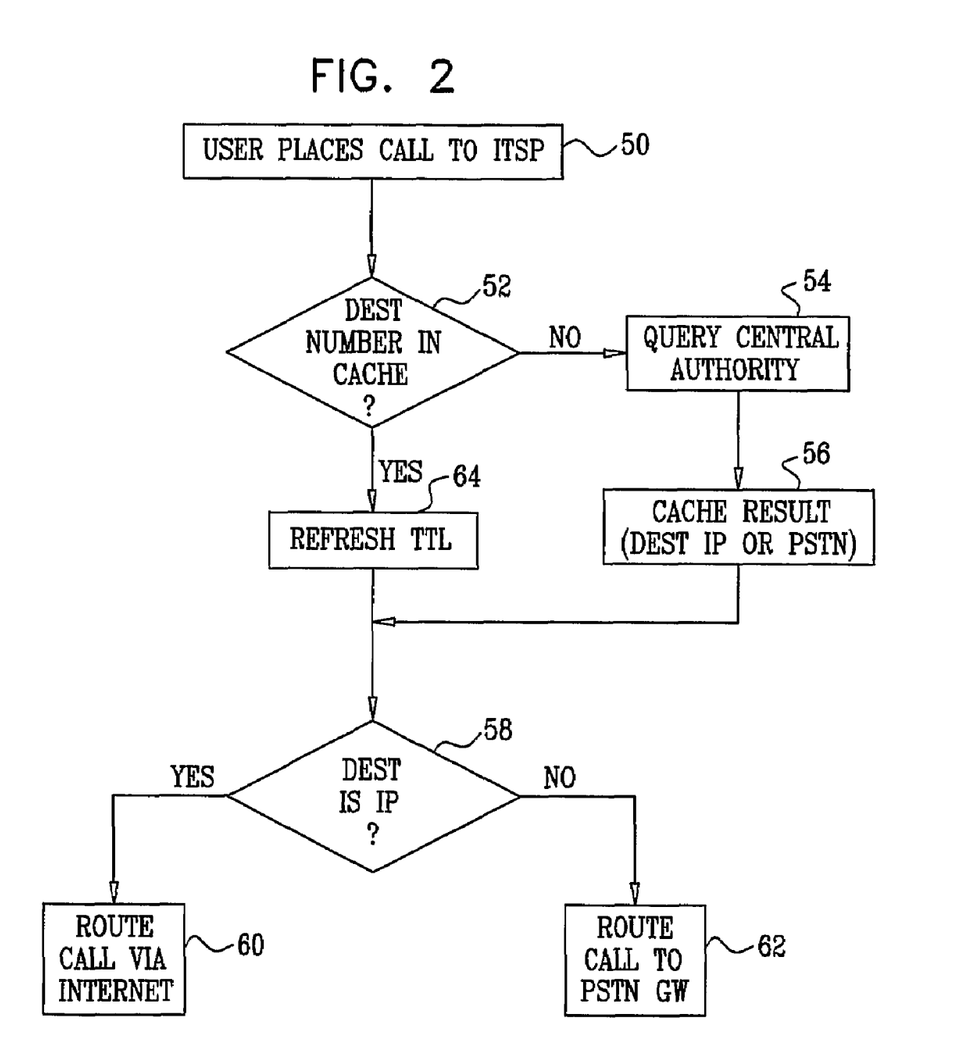
FIG. 2 is a flow chart that schematically illustrates a method for placing telephone calls via an ITSP, in accordance with an embodiment of the present invention.

FIG. 2 is a flow chart that schematically illustrates a method for placing calls via ITSP 32, in accordance with an embodiment of the present invention. (The same method may be used, mutatis mutandis, by ITSP 34 and other ITSPs that are affiliated with the central authority that maintains database 28.) The method is initiated when the user of IP phone 30 places a call to a destination telephone number via ITSP 32, at a call initiation step 50. The ITSP refers the destination number to LICS 42, which checks whether the number is recorded in the local cache that it maintains, at a cache checking step 52. The cache may also contain DID numbers that are assigned to subscribers of ITSP 32, along with the corresponding IP addresses, in order to avoid having to make two separate lookups for external telephone numbers and internal DID numbers.

The data may be stored in the cache using any suitable method known in the art. For example, the data may be stored in a very long bit array that contains every possible E.164 number, offset by the lowest one. The LICS may then check each queried number simply by reading from the array at the offset indicated by the number. Alternatively, the data may be stored in a denary tree structure with ten roots, wherein each number is stored at the appropriate node. The LICS in this case checks each queried number by traversing the tree, so that for a ten-digit number, a maximum of n searches are required. For non-sequential data (such as SIP URI addressing), standard text-based data storage and indexing may be applied.

If there is no cache entry for the requested number (typically because this is the first call by a subscriber of ITSP 32 to the number, or because the previous cache entry has expired), LICS 42 sends a query to server 26 to ask for the packet network address associated with the number, at a query step 54. At this point, LICS 42 may wait for a response from the server before replying to the ITSP, or it may alternatively send an immediate negative response to the ITSP (so that the ITSP will route the call—presumably via the PSTN—while avoiding the delay of waiting for the response from server 26). When LICS 42 receives the response from server 26, it caches the result, at a caching step 56. Thus, even if a positive response returns from the central server after the LICS has already sent a negative response to the ITSP, the "damage" of sub-optimal routing affects only this first call, as the LICS will already have the cached "positive" value when the next call is placed to this number.

In the scenario shown in FIG. 1, for example, the cached result may be the URI address of a SIP proxy operated by ITSP 34 or by intermediate server 37, or it may even identify the URI or IP address of phone 36. The result may depend, inter alia, on the level of trust between ITSPs 32 and 34. Alternatively, if the response from server 26 is negative, LICS 42 may cache a negative result, to indicate that calls to the destination number in question are to be routed to PSTN 24 via gateway 38. This sort of "negative caching"—indicating telephone numbers for which no record will be found in database 28—saves substantial time in avoiding transmission of unnecessary queries to the database. The DNS and ENUM protocols themselves make no provision for storing this sort of negative results.

Additionally or alternatively, LICS 42 may query multiple remote servers, either simultaneously or sequentially. For example, upon receiving a negative response from a first server with respect to a given number, indicating that the first server does not have a packet network address for the number, the LICS may then query a second server. If the second server returns a positive response, with a packet network address, then the LICS caches this result, rather than the negative (PSTN) result returned by the first server. (In this respect, the query system used by the LICS differs from the DNS query protocol, in that the LICS continues to query different servers even after having received a authoritative—although negative—response from the first server.)

LICS 42 returns the destination address (whether on network 22 or gateway 38) to the SIP proxy of ITSP 32, at a destination determination step 58. If the destination is a URI or IP address on packet network 22, the SIP proxy routes the call to the appropriate address, at an Internet routing step 60. Otherwise, in the case of a negative result, the SIP proxy routes the call to gateway 38, at a PSTN routing step 62.

On the other hand, if LICS 42 discovers a cache hit at step 52, then there is no need to query database 28 before placing the call. Instead, LICS 42 refreshes a persistence time-to-live (TTL) timestamp, typically defined by the ITSP, for this entry in the cache, at a TTL refresh step 64. This timestamp controls the persistence of records in the local cache and is used by LICS 42 in periodically purging (also known as "aging out") entries with stale timestamps in order to free up memory space in the cache. (Details of this process are described hereinbelow with reference to FIG. 3.)

Entries in the LICS can also become stale due to changes at the central server. (For example, a number that was previously listed as belonging to a certain ITSP was ported out of the control of the ITSP, and may have even been changed to a PSTN number.) In order to avoid this sort of situation, an update TTL timestamp, set by the central server, may be associated with each entry. This latter timestamp indicates when the central server wishes the LICS to re-request a number. This TTL is attached to the response sent to the LICS from the central server.

LICS 42 returns the cached destination address to the SIP proxy at step 58, which may proceed to place the call as described above. Alternatively, as noted above, the LICS may have already automatically responded negatively to the first query from the ITSP regarding a given number. In this case, the LICS may proceeds to query database 28 in non-real-time.

In the scheme described above, when a new LICS is deployed initially, all calls will require queries to the central authority. Over time, however, as more and more calls are repeat calls to numbers already held in the LICS cache, the number of queries to the central authority will drop, probably to about 20% or less of all calls. The set of cache records in a given LICS is thus automatically tailored to the calling habits of the subscribers of the ITSP. If an ITSP or enterprise deploys a LICS for its users or partitions its user space to utilize different LICSs, each LICS instance will adapt itself according to the calling patterns that characterize the specific set of users that the LICS serves. No additional configuration is necessary. In contrast to DNS-based update schemes that are known in the art, each LICS manages and updates its own cache, without relying on server 26 to maintain any sort of information regarding the cache contents.

Refreshing Cached Records

Figure 3:
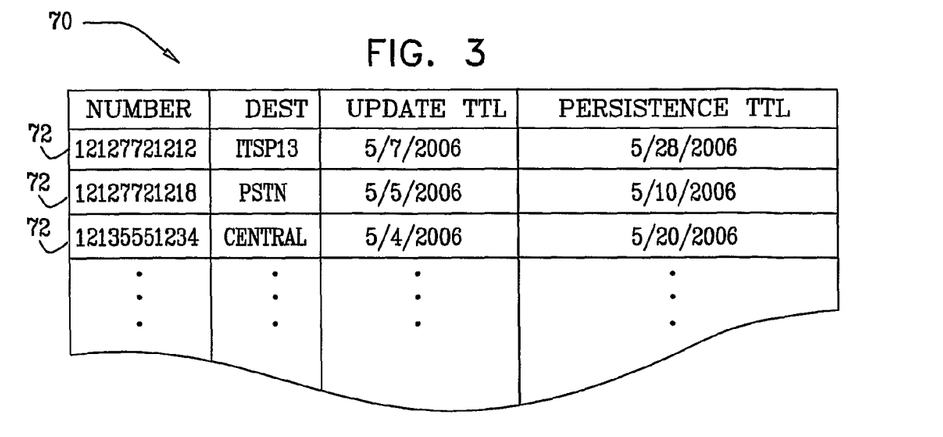
FIG. 3 is a table that schematically shows contents of a local cache of telephone call routing information, in accordance with an embodiment of the present invention.

FIG. 3 is a table that schematically illustrates records 72 in an exemplary cache 70 of LICS 42, in accordance with an embodiment of the present invention. Each record is indexed by the destination E.164 telephone number and has an Internet destination field indicating the URI or IP address to which calls to the telephone number are to be directed. Optionally, as noted above, cache 70 may also contain the DID numbers and IP addresses of subscribers of ITSP 32. Records that are to be directed to PSTN 24 may by marked by a flag (not shown) for this purpose, and/or may contain the IP address of gateway 38 in the destination field.

In this embodiment, each record 72 contains two TTLs:
- The "persistence TTL" (which is updated at step 64 in FIG. 2) determines how long the record should stay in the cache. Every time a subscriber places a call to the corresponding telephone number, the persistence TTL is extended.
- The "update TTL" determines how long the integrity of the record is trusted. It is set initially when the record is received from database 28 and is not extended. When the update TTL expires, LICS 42 requests an update from database 28 to refresh the data in the record.

The persistence TTL value determines the ultimate overall size of the LICS cache, whereas the update TTL sets the maximum time before changes in information are propagated down to the LICS from database 28. For example, the first time a given telephone number is dialed, LICS 42 may receive a negative answer from database 28, indicating that the number resides in the PSTN domain. The LICS caches the information and assigns a persistence TTL of thirty days and an update TTL of seven days. When the number is dialed again on day five, LICS 42 adds five days to the persistence TTL value, but leaves the update TTL unchanged. On day seven, when the update TTL expires, the LICS requests an update from the central authority regarding the telephone number of the record in order to ensure that the record is current. Upon receiving the update, the LICS resets the update TTL to seven days later. In the event that the number is not dialed again, and the persistence TTL expires, the LICS will purge the record from the cache.

The use of the update TTL enables the LICS to keep up with changes in telephone number location data. For example, in countries that support Local Number Portability (LNP), such as the United States, customers who transfer to a VoIP service may keep their existing PSTN telephone number. The update TTL will determine the maximum time that can pass before the LICS becomes aware of the change. The same sort of updating applies to numbers that are transferred from one ITSP to another, as well as to changes in the IP addresses of the ITSPs themselves (assuming anonymity is not required).

LICS 42 typically reviews the TTL values in cache 70 and updates or purges records 72 as a background process, independently of the query/response process of FIG. 2. Thus, the update/purge process has little or no effect on the real-time performance of the LICS. Furthermore, because synchronization of the cached records with database 28 in this manner is controlled and carried out locally by the LICS, it can be carried out without requiring that server 26 and database 28 be aware in any way of the state of the LICS cache or involved in any way in logging and managing cache updates. This scheme reduces the burden on the central server relative, for example, to DNS update schemes that are known in the art.

Data Security and Access Control

As noted above, ITSPs may be unwilling to release subscriber information to non-trusted third parties, because of the risk that these parties (such as rival ITSPs) will take advantage of the information to discover and make unauthorized approaches to their subscribers. One possible solution to this problem, as described above, is to use server 37 as an intermediary proxy in VoIP calls in order to maintain the mutual anonymity of the ITSPs. This measure provides only partial protection, however, because DNS and ENUM are open standards, in which records are maintained in plain alphanumeric form. Therefore, absent other protective measures, third parties may succeed without great effort in reading and using the ENUM records posted in database 28 by an ITSP.

In order to mitigate this problem, database 28 may store and transmit records in encrypted form. An LICS (or other party) will then be able to decrypt the information only if it has the required key. Furthermore, the LICS may store the data in encrypted form, including local disk backup, to protect from any access to the data other than genuine call queries. Other storage features may also be implemented to prevent unauthorized data mining. Access to the data held by the LICS may be limited to the defined query interfaces (such as ENUM or SIP) used by the ITSP, whereby the response is returned unencrypted for local processing by the ITSP. The LICS may use access control lists in processing queries so that only authorized parties are allowed to access cached data. Furthermore, queries may be analyzed to detect anomalous patterns that could be indicative of data mining attempts, and suspicious queries may thus be denied.

Additionally or alternatively, encryption and authentication mechanisms and protocols known in the art, such as Simple Object Access Protocol (SOAP) over HTTPS, may be used in transmitting data between server 26 and LICS 42.

Further additionally or alternatively, the central authority may use access control lists in determining how to respond to LICS queries. Thus, different responses may be returned to the same query based on the identity of the querying party. In this way, confidential information may be passed to an authorized LICS, whereas generic, anonymized, or null data is returned to another, non-authorized LICS requesting the very same DID. An organization may have an anonymization requirement for all other organizations, other than those appearing on an authorized access list. In this case, when server 26 responds to a request from an authorized LICS regarding a number provisioned by the organization, it will provide a URI or IP address at which the number can be reached directly, while in other cases it will respond with the IP address of server 37, thus hiding the identity of the destination organization.

Hybrid Caching

The scheme described above assumes no foreknowledge of the distribution of telephone numbers among ITSPs. In some cases, however, specific codes are assigned to IP-destined phone numbers, or ranges of phone numbers are provisioned to ITSPs. In such situations, it may be more efficient for LICS 42 to store the range of numbers that are known in advance to be IP phones, rather than to cache the numbers individually. In such cases, the LICS may download and store the records for the entire range from database 28, in addition to individually querying and caching numbers outside the range.

Additionally or alternatively, if subscribers of an ITSP or enterprise tend to make calls primarily locally, and that local region has a manageable number of telephone numbers listed in database 28, then it may be advantageous for the LICS to download and store the entire set of records from database 28 for that region. In this way, the LICS can give a definitive answer whenever a subscriber dials a telephone number in the region: If the LICS has the number in its cache, then it is an IP destination; otherwise, it is definitely a PSTN number.

In this manner, the LICS acts both as an Authoritative Name Server on a pre-defined range or ranges of numbers, and as a caching server on the remaining numbers. The control of the balance between the authoritative and cache functions can be implemented either directly, under the specific control of a system manager, or on an automated basis, based on call distribution analysis. Typically, as noted above, for common call destinations, the data held by the LICS is synchronized fully with the central database, so that the LICS as the authoritative server for these destinations, while for the less common call destinations, the caching mechanism is used. The authoritative and cache functions may be balanced in order to optimize query speed, data integrity and synchronization bandwidth. An optimization calculation for this purpose may be based on call destination analysis, number of distinct telephone number dialed and total number of telephone numbers, size of the main LICS data store, and sensitivity to remote querying as against local data storage.

For example, an ITSP in Germany may determine that its subscribers call mainly German phone numbers. There are only a few other ITSPs in Germany, and database 28 holds a few hundred thousand records of German phone numbers (beginning with the E.164 country code of "49"). The LICS of the German ITSP could then download all the records from database 28 that begin with "49." Upon receiving any subsequent call starting with 49, the German ITSP need not query database 28, since the LICS can always determine whether the call is destined for an IP phone (if there is an entry for the number in cache) or for the PSTN (if no entry is found). For dialed numbers outside Germany, the ITSP may use the method of FIG. 2 to cache both positive and negative records and to query database 28 on a call-by-call basis.

Figure 4:
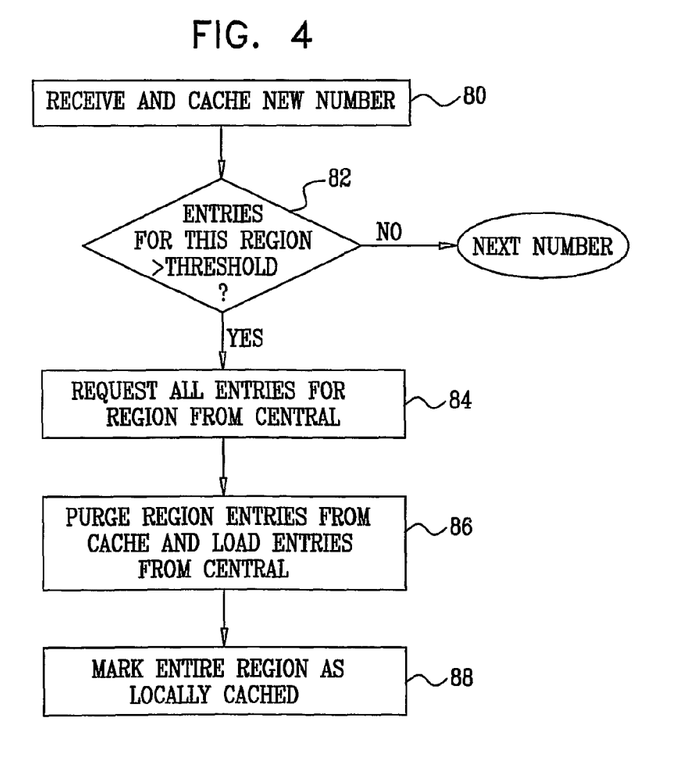
FIG. 4 is a flow chart that schematically illustrates a method for updating a local cache of telephone call routing information, in accordance with an embodiment of the present invention.

FIG. 4 is a flow chart that schematically illustrates a hybrid method for updating LICS 42, in accordance with an embodiment of the present invention. This method combines the individual query and caching method of FIG. 2 with the block caching method described above, under dynamic, automatic control of the LICS. In this embodiment, the ITSP is able to configure the LICS to automatically download and store all the records in database 28 for any region (for example, a given area code) that takes up more than a certain threshold fraction, such as 20%, of its cache space.

In the hybrid scheme of FIG. 4, LICS 32 receives and caches new individual records for telephone numbers dialed by subscribers of ITSP 32, at a record caching step 80. Periodically—after a certain number of queries or a certain amount of time has passed—the LICS counts the records its cache by region, at an entry counting step 82. If the number of records for a given region is greater than the threshold configured by the ITSP, the LICS sends a request to server 26 to download all records in database 28 for that region, at a download request step 84. Before receiving the records, LICS 42 purges all other entries (including the "negative records" of PSTN numbers) for the region in question from its local cache, at a purging step 86. It then loads in the new records for the entire region that are transmitted by server 26. The LICS marks the entire region as having been locally cached, at a cache marking step 88. This marking indicates to the LICS subsequently that queries for the region need never be referred to database 28 (except for background cache updates when the update TTL expires). If a dialed number in this region does not appear in the cache, the ITSP simply routes the call to PSTN 24.

For example, a new LICS installed by an ITSP in Southern Texas (country code 1, area code 956) may initially work on a call-by-call basis, storing positive (IP) and negative (PSTN) records for telephone numbers dialed by its subscribers. After a certain time has passed, the LICS may recognize that "1956" is the main call destination, and may therefore request from database 28 all entries in the 956 area code. From then on local calls are all handled by the LICS without querying the central database. As time goes on, the LICS may determine that other regions are also called frequently (such as adjacent Texas regions with area code 361 or 830, or cross-border calls to Mexico with country code 52). At that point, the LICS downloads the records for these regions and purges all other entries associated with the regions from its cache. The ITSP may set the threshold that triggers region download at step 82 to optimize performance by heuristically maximizing the frequency of cache hits by the LICS.

Alternative Embodiments

Although system 20 and the methods described hereinabove make reference particularly to DNS and ENUM, the principles of the present invention may similarly be applied using other protocols and standards, as well as proprietary, non-standard numbering plans (including private ENUM), protocols and data formats. For example, LICS 42 may use SIP REDIRECT messages to access database 28 via packet network 22 or may use Transaction Capabilities Application Part (TCAP) messages to access the database over a SS7 network (such as PSTN 24, which could deploy its own LICS for placing calls to IP phones). Additionally or alternatively, internal communication between ITSP 32 and LICS 42 may be based on ENUM or on one of these other exemplary protocols, regardless of the protocol that is used in communication between LICS 42 and server 26. The data structures and memory use in LICS 42 can be optimized for efficiency without the constraint of holding the information in a DNS-compatible format.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method for telephony, comprising:

receiving at an Internet telephony service provider a subscriber request from an Internet Protocol, IP, telephony user terminal which is directly connected to the Internet telephony service provider via a packet switched data link to place a call to a telephone number;

in response to the subscriber request, querying a cache associated with the Internet telephony service provider to check if the cache holds a record for the telephone number;

if the cache holds a record for the telephone number, obtaining the record and:
 if the record is a packet network address, placing the call to the packet network address associated with the endpoint user terminal telephone number, and
 if the record indicates that there is no packet network address associated with the telephone number, placing the call to the endpoint user terminal telephone number via a public switched telephone network PSTN);

if the cache does not hold a record for the telephone number, sending a request to a database server, which maintains a database of records associating endpoint user terminal telephone numbers of subscribers with respective packet network addresses of the endpoint user terminal, each packet network address being uniquely associated with a subscriber, to retrieve a packet network address of the endpoint user terminal to which calls to the telephone number should be placed;

if the database server holds a record of a packet network address of the endpoint user terminal telephone number, the database server notifying the Internet telephony service provider of the packet network address of the endpoint user terminal;

if the database server does not hold a record of a packet network address of the endpoint user terminal telephone number, the database server notifying the Internet telephony service provider with a negative response that no record of a packet network address associated with the endpoint user terminal telephone number was found;

upon receiving the notification from the database server, storing the packet network address or the negative response, as appropriate, in the cache as a record for the telephone number;

after storing the record, receiving at the Internet telephony service provider a further subscriber request from an IP telephony user terminal to place a further call to the telephone number;

in response to the further subscriber request, querying the cache to obtain the record and:

if the record is a packet network address, placing the further call to the packet network address associated with the endpoint user terminal telephone number, and if the record indicates a negative response, placing the further call to the endpoint user terminal telephone number via a public switched telephone network (PSTN).

2. The method according to claim 1, further comprising:
selecting a group of telephone numbers in the database that share a common characteristic, and
downloading to the cache from the server all of the records with respect to the telephone numbers in the group.

3. The method according to claim 2, wherein selecting the group comprises:
making a count of the records that have been stored in the cache in response to subscriber requests to place calls to the telephone numbers that share the common characteristic, and
downloading all of the records with respect to the telephone numbers in the group if the count is equal at least to a predetermined threshold.

4. The method according to claim 2, wherein the common characteristic comprises at least one of a country code and an area code.

5. The method according to claim 1, wherein storing the record comprises setting an update time in the record, and upon expiration of the update time, automatically sending a further request to the server in order to update the record, independently of receiving subscriber requests to call the specified telephone number.

6. The method according to claim 5, wherein storing the record further comprises setting a persistence time in the record, and automatically purging the record if no further subscriber request to call the specified telephone number is placed before expiration of the persistence time.

7. The method according to claim 1, wherein sending the request and receiving the notification comprise: communicating with the server in accordance with a first protocol, and wherein querying the cache to obtain the record comprises delivering the record from the cache to the Internet telephony service provider in accordance with a second protocol, different from the first protocol.

8. The method according to claim 1, wherein the notification is received over a public network from the server in an encrypted format, and further comprising decrypting the notification at the Internet telephony service provider.

9. The method according to claim 8, wherein storing the record comprises encrypting the record that is stored in the cache.

10. The method according to any claim 1, wherein querying the cache to obtain the record comprises the cache providing the network address subject to a data access restriction.

11. The method according to claim 1, wherein when the specified telephone number is assigned to an IP telephony user terminal subscribed to a further, second Internet telephony service provider, and wherein the packet network address indicated by the record belongs to an intermediary server, which is configured to connect calls to the specified telephone number without enabling the first Internet telephony service provider to determine that the calls have been placed via the further Internet telephony service provider.

12. The method according to claim 11, wherein the packet network address belonging to the intermediary server is a first packet network address, and comprising associating access permissions with the records at the server, so that in response to the permissions associated with the record with respect to the specified telephone number, the server furnishes to a further, third Internet telephony service provider a second packet network address belonging to the second Internet telephony service provider for use in placing a further, third call to the specified telephone number, while furnishing only the first packet network address to the first Internet telephony service provider.

13. The method according to claim 1, wherein sending the request to the server comprises sending a Domain Name System, DNS, request to the server, and wherein placing the call to the packet network address comprises placing Voice over Internet Protocol, VoIP, calls.

14. The method according to claim 1, wherein if the server notifies the Internet telephony service provider with a negative response that no record of a packet network address associated with the endpoint user terminal telephone number was found, further comprising:
sending a further provider request with respect to the specified telephone number to a further server; and
upon receiving the notification from the further server, storing the record in the cache.

15. The method according to claim 1, wherein storing the record comprises storing the record at a node of a tree structure in the cache, wherein the node is selected in response to the specified telephone number, and wherein querying the cache to obtain the record comprises searching the tree.

16. The method according to claim 1, wherein if the cache does not hold a record for the telephone number and the database server holds a record of the packet network address of the endpoint user terminal telephone number, further comprising placing the call to the packet network address associated with the endpoint user terminal telephone number after the database server notifies the Internet telephony service provider of the packet network address of the endpoint user terminal.

17. The method according to claim 1, wherein if the cache does not hold a record for the telephone number and the database server does not hold a record of the packet network address of the endpoint user terminal telephone number, further comprising placing the call to the endpoint user terminal telephone number via the public switched telephone network after the database server notifies the Internet telephony service provider with the negative response.

18. The method according to claim 1, wherein if the cache does not hold a record for the telephone number, further comprising placing the call to the endpoint user terminal telephone number via the PSTN whilst the request is sent to the database server to retrieve the packet network address of the endpoint user terminal to which calls to the telephone number should be placed.

19. An Internet Protocol, IP, telephony apparatus for an Internet telephony service provider, the apparatus comprising:
an Internet telephony service provider server, which is configured to receive a subscriber request from a plurality of IP telephony user terminals directly connected to the Internet telephony service provider via a packet switched network data link to place a call to a telephone number; and
a cache, which is arranged to store records associating endpoint user terminal telephone numbers with respective packet network addresses, and
wherein the Internet telephony service provider service is operative, in response to the subscriber request, to query the cache to check if the cache holds a record for the telephone number and if the cache holds a record for the telephone number, the server is operative to obtain the record and:
if the record is a packet network address, place the call to the packet network address associated with the endpoint user terminal telephone number, and
if the record indicates that there is no packet network address associated with the telephone number, place the call to the endpoint user terminal telephone number via a public switched telephone network (PSTN);
wherein if the cache does not hold a record for the telephone number, the cache is operative to send a request to a database server, which maintains a database of records associating endpoint user terminal telephone numbers of subscribers with respective packet network addresses of the endpoint user terminal, each packet network address being uniquely associated with a subscriber, to retrieve a notification of a packet network address of the endpoint user terminal to which calls to the telephone number should be placed or to retrieve a notification of a negative response if no record of a packet network address associated with the endpoint user terminal telephone number is found in the database server;
upon receiving the notification from the database server, the Internet telephony service provider server being operative to store the packet network address or the negative response, as appropriate, in the cache as a record for the telephone number, and
wherein the Internet telephony service provider server is further operative, in response to receiving a request from a further IP telephony user terminal to place a further call to the telephone number, to query the cache and obtain—the record and:
if the record is a packet network address, to place the further call to the packet network address associated with the endpoint user terminal telephone number; and
if the record indicates a negative response, to place the further call to the endpoint user terminal telephone number via a public switched telephone network, PSTN.

20. The apparatus according to claim 19, wherein the cache is arranged to select a group of telephone numbers in the database that share a common characteristic, and to download from the database server all of the records with respect to the telephone numbers in the group.

21. The apparatus according to claim 20, wherein the cache is operative to make a count of the records that have been stored in the cache in response to subscriber requests to place calls to the telephone numbers that share the common characteristic, and to download all of the records with respect to the telephone numbers in the group if the count is equal at least to a predetermined threshold.

22. The apparatus according to claim 20, wherein the common characteristic comprises at least one of a country code and an area code.

23. The apparatus according to claim 19, wherein the cache is arranged to set an update time in the record, and upon expiration of the update time, to automatically send a further request to the database server in order to update the record, independently of receiving subscriber requests to call the specified telephone number.

24. The apparatus according to claim 23, wherein the cache is further operative to set a persistence time in the record, and to automatically purge the record if no further subscriber request to call the specified telephone is placed before expiration of the persistence time.

25. The apparatus according to claim 19, wherein the cache is arranged to communicate with the database server in accordance with a first protocol, and to deliver the record to the Internet telephony service provider server in accordance with a second protocol, different from the first protocol.

26. The apparatus according to claim 19, wherein the notification is received over a public network from the second server in an encrypted format, and is decrypted at the Internet telephony service provider.

27. The apparatus according to claim 19, wherein the record that is stored in the cache is encrypted.

28. The apparatus according to claim 19, wherein the cache is arranged to provide the network address subject to a data access restriction.

29. The apparatus according to claim 19, wherein when the specified telephone number is assigned to an IP telephony user terminal subscribed to a further, second Internet telephony service provider, and wherein the packet network address indicated by the record belongs to an intermediary server, which is configured to connect calls to the specified telephone number without enabling the first Internet telephony service provider to determine that the calls have been placed via the further Internet telephony service provider.

30. The apparatus according to claim 29, wherein the packet network address belonging to the intermediary server is a first packet network address, and wherein access permissions are associated with the records at the second server, so that in response to the permissions associated with the record with respect to the specified telephone number, the server furnishes to a further, third Internet telephony service provider a second packet network address belonging to the second Internet telephony service provider for use in placing a further, third call to the specified telephone number, while furnishing only the first packet network address to the first Internet telephony service provider.

31. The apparatus according to claim 19, wherein the cache is arranged to send the provider request as a Domain Name System, DNS, request to the database server, and wherein the Internet telephony service provider server is arranged to place the call to the packet network address as Voice over Internet Protocol, VoIP, calls.

32. The apparatus according to claim 19, wherein if no record of a packet network address associated with the endpoint user terminal telephone number is found in the database server, the cache is arranged to send a further request with respect to the specified telephone number to a further database server, and to store the packet network address or the negative response, as appropriate as a record for the telephone number in the cache upon receiving the notification from the further database server.

33. The apparatus according to claim 19, wherein the cache is arranged to store the record at a node of a tree structure, wherein the node is selected in response to the specified telephone number, and is arranged to search the tree in order to read out the record.

34. The apparatus as claimed in claim 19, wherein the cache is separate from the Internet telephony service provider server.

35. The apparatus according to claim 19, wherein if the cache does not hold a record for the telephone number and the database server holds a record of the packet network address of the endpoint user terminal telephone number, the Internet telephony service provider server is further operative to place the call to the packet network address associated with the endpoint user terminal telephone number after the database server notifies the Internet telephony service provider of the packet network address of the endpoint user terminal.

36. The apparatus according to claim 19, wherein if the cache does not hold a record for the telephone number and the database server does not hold a record of the packet network address of the endpoint user terminal telephone number, the Internet telephony service provider server is further operative to place the call to the endpoint user terminal telephone number via the public switched telephone network after the database server notifies the Internet telephony service provider with the negative response.

37. The apparatus according to claim 19, wherein if the cache does not hold a record for the telephone number, the Internet telephony service provider server is further operative to place the call to the endpoint user terminal telephone number via the PSTN whilst the request is sent to the database server to retrieve the packet network address of the endpoint user terminal to which calls to the telephone number should be placed.

38. A system for Internet Protocol, IP, telephony, comprising:
   an Internet telephony service provider server arranged to receive subscriber requests from Internet Protocol, IP, telephony user terminals which are directly connected to the Internet telephony service provider server via a packet switched data link;
   a cache associated with the Internet telephony service provider server, the cache holding records for endpoint user terminal telephone numbers, and
   a database server, which is arranged to maintain a database of records associating endpoint user terminal telephone numbers of subscribers with respective packet network addresses of the endpoint user terminal, each packet network address being uniquely associated with a subscriber, and which is in communication with the Internet telephony service provider server via a public network;
   wherein the Internet telephony service provider server is arranged, in response to a subscriber request to place a call to a telephone number, to query the cache associated with the Internet telephony service provider to check if the cache holds a record for the telephone number; and
   if the cache holds a record for the telephone number, to obtain the record and:
      if the record is a packet network address, place the call to the packet network address associated with the endpoint user terminal telephone number, and
      if the record indicates that there is no packet network address associated with the telephone number, place the call to the endpoint user terminal telephone number via a public switched telephone network (PSTN); and
   if the cache does not hold a record for the telephone number, to send a request to the database server, to retrieve a record indicating a packet network address of the endpoint telephone number to which calls to the specified telephone number should be placed,
   if the server holds a record of a packet network address of the endpoint user terminal telephone number, the database server is arranged to notify the Internet telephony service provider of the packet network address of the endpoint user terminal;
   if the server does not hold a record of a packet network address of the endpoint user terminal telephone number, the server is arranged to notify the Internet telephony service provider with a negative response that no record of a packet network address associated with the endpoint user terminal telephone number was found;
   upon receiving the notification from the database server, to store the packet network address or the negative response, as appropriate, in the cache as a record for the telephone number, and
   wherein the Internet telephony service provider server is arranged, in response to receiving a further subscriber request to place a further call to the specified telephone number after storing the record, to query the cache to obtain the record; and
      if the record is a packet network address, to place the further call to the packet network address associated with the endpoint user terminal telephone numbers and
      if the record indicates a negative response, to place the further call to the endpoint user terminal telephone number via a public switched telephone network (PSTN).

39. The system according to claim 38, wherein the database server is arranged to receive a selection of a group of the telephone numbers in the database that share a common characteristic, and to download to the cache all of the records with respect the telephone numbers in the group.

40. The system according to claim 39, wherein at least one of the Internet telephony service provider server and the database server is arranged to select the group of the telephone numbers in response to a count of subscriber requests to place calls to the telephone numbers that share the common characteristic.

41. A cache device associated with an Internet telephony service provider, the cache device comprising a memory and being configured to:
   receive a first subscriber request originating from an Internet Protocol (IP) telephone user terminal directly connected to the said Internet telephony service provider via a packet switched data link and proxied via the said service provider to the cache, to place a call to a telephone number;
   check if a record is held for the telephone number;
   if the cache holds a record for the telephone number, obtain the record and pass the record to the said service provider;
   if the cache does not hold a record for the telephone number, send a request to a database server, which maintains a database of records associating endpoint user terminal telephone numbers of subscribers with respective packet network addresses of the endpoint user terminal, each packet network address being uniquely associated with a subscriber, to retrieve a record indicating a packet network address of the endpoint user terminal to which calls to the telephone number should be placed, the said database server being configured to send a notification comprising the packet network address of the endpoint user terminal if the database server holds a record for the telephone number and the notification comprising a negative response if the database server does not hold a record for the telephone number;
   receive the notification from the said server;
   store the packet network address, as appropriate, as a record for said telephone number in the memory of the cache;
   in response to a further subscriber request to place a further call to the telephone number, read the record of said first telephone number from the memory;
   return the record indicating a packet network address to which calls to the telephone number should be placed, as appropriate, to said Internet telephony service provider.

42. The cache as claimed in claim 41, wherein the cache is further configured to default to a PSTN when routing information does not exist for a packet switched network.

43. A cache device associated with an Internet telephony service provider, the cache device comprising a memory and being configured to:

receive a first subscriber request originating from an Internet Protocol (IP) telephone user terminal associated with the said Internet telephony service provider and proxied via the said service provider to the cache, to place a call to a telephone number;

check if a record is held for the telephone number;

if the cache holds a record for the telephone number, obtain the record and pass the record to the said service provider;

if the cache does not hold a record for the telephone number, send a request to a plurality of database servers, each server maintaining a database of records associating endpoint user terminal telephone numbers of subscribers with respective packet network addresses of endpoint user terminal, each packet network address being uniquely associated with a subscriber, to retrieve a record indicating a packet network address of endpoint user terminal to which calls to the telephone number should be placed, each said database server being adapted to send a notification comprising the packet network address of the endpoint user terminal if the database server holds a record for the telephone number and the notification comprising a negative response if the database server does not hold a record for the telephone number;

receive the notification of from one or more of the said servers;

store the packet network address, as appropriate as a record or records of said telephone number in the memory of the cache;

in response to a further subscriber request to place a further call to the telephone number, read the record of said telephone number from the memory; and return the record or records indicating a packet network address to which calls to the telephone number should be placed, as appropriated, to the said Internet telephony service provider.

44. A cache as claimed in claim 43, wherein the cache is further configured to send the request to the said plurality of database servers simultaneously.

45. A cache as claimed in claim 43, wherein the said plurality of database servers comprise two database servers and the cache sends the request to one of said database servers and sends the request to the other database server either after receiving a negative response or after receiving no response within a predetermined time period from said database server.

46. A cache as claimed in claim 45, wherein the said plurality of database servers comprise subsequent database servers and the cache sends the request consecutively to each of said subsequent database servers either after receiving a negative response or after receiving no response within a predetermined time period from each previous said server.

47. The cache as claimed in claim 43, wherein the cache is further configured to default to a PSTN when routing information does not exist for a packet switched network.

\* \* \* \* \*